April 13, 1954

H. A. BILLETTER 2,675,076

CONTROL SYSTEM AND CARRIAGE MOVING
MEANS FOR FLYING CUTOFF APPARATUS

Filed Aug. 15, 1951

INVENTOR
HALTON A. BILLETTER

BY Francis J. Klempay

ATTORNEY

April 13, 1954

H. A. BILLETTER 2,675,076

CONTROL SYSTEM AND CARRIAGE MOVING
MEANS FOR FLYING CUTOFF APPARATUS

Filed Aug. 15, 1951

INVENTOR
HALTON A BILLETTER

BY *Francis J. Klempay*

ATTORNEY

Patented Apr. 13, 1954

2,675,076

UNITED STATES PATENT OFFICE 2,675,076

CONTROL SYSTEM AND CARRIAGE MOVING MEANS FOR FLYING CUTOFF APPARATUS

Halton A. Billetter, Youngstown, Ohio, assignor to The McKay Machine Company, Youngstown, Ohio, a corporation of Ohio Application August 15, 1951, Serial No. 241,918

12 Claims. (Cl. 164—60)

This invention relates to improved apparatus for cutting moving stock such as pipe, tubing, rods and the like into pieces of substantially predetermined length as the stock continuously issues from an electric weld tube mill, for example, and more particularly to improved arrangements for moving a cut-off device through a reciprocatory cycle, part of which is synchronous with the advancing stock, and to improved control systems for effecting precisely timed sequential actuations of various essential components of the complete cut-off assembly. The principal object of the apparatus of the invention is to increase the accuracy of operational results of flying cut-offs of the kind mentioned while at the same time maintaining simplicity in adjustments required during normal operation, and retaining high versatility in the apparatus. Also, the invention seeks to provide in apparatus of the character mentioned having the highly desirable characteristics enumerated, improved degrees of ruggedness, durability, and safety in operation so that the apparatus may, in general, operate over long periods of time with little or no attention in effecting extreme accuracy in the cutting of continuous moving stock into predetermined lengths.

While many different parting tools have heretofore been proposed in flying cut-off machines, it is generally recognized that rotary lathe-type cutting tools are best suited for metal pipe and tubing because of the cleanness of cut but such apparatus is quite heavy and unwieldy and heretofore no entirely satisfactory method has been devised to effect the required reciprocatory cycle of movement of the apparatus including a quick initial acceleration to synchronism with the advancing tube or pipe and thereafter a synchronous movement therewith for a length of time sufficient to part the stock. The present invention, however, solves this problem by improved mechanisms for moving the cut-off carriage through its reciprocatory cycle as required.

The last mentioned result is accomplished by this invention primarily by employing a mechanical accelerating device operated from and/or synchronously with the stock propelling means of the tube mill or other processing apparatus with which the cut-off assembly is associated in combination with means on the movable cut-off carriage to rigidly clamp the advancing stock to the carriage immediately upon the carriage attaining the same speed as the stock so that the parting tool or tools employed can function properly and effectively during a short interval of outward travel of the tube. The invention also resides in improved control instrumentalities whereby the extending free length of stock clamped may be very precisely predetermined and controlled and whereby the sequencing of actuation of the accelerating means, clamping means and stock parting means may be controlled with consistent microsecond accuracy whereby uniform results are obtained and a maximum part of the total time of the reciprocatory cycle is available for the actual parting operation. Contributing to the latter result is also an improved arrangement for unclamping the cut-off carriage from the stock and returning the carriage back to its initial starting position at the end of each cutting stroke.

The improved control system of the apparatus of this invention inherently provides a simplified adjustment for compensating for relative changes in operational time delay inherent in all control instrumentalities such as solenoids, air valves and pistons. Thus, upon a change in speed of the advancing stock a greater or less increment of the stock will pass a given point during a predetermined interval of time as for example that required to effect full actuation of a movable initiating lever for the mechanical accelerating means following close of contacts of an initiating switch. The present invention combines and assembles the various control instrumentalities in such manner that such relative time variations may be compensated for simply and directly by moving a target switch outwardly or inwardly along the path of travel taken by the advancing stock. Through the use of this feature and of other features of the control system to be described in detail below it is possible, after proper adjustment, to obtain much greater consistent accuracy in the length of the stock pieces cut off than has heretofore been possible in any comparable apparatus.

The above and other objects and advantages of the invention will become apparent upon consideration of the following detailed specification and the accompanying drawing wherein the preferred embodiment of the invention is fully disclosed.

Figure 2:
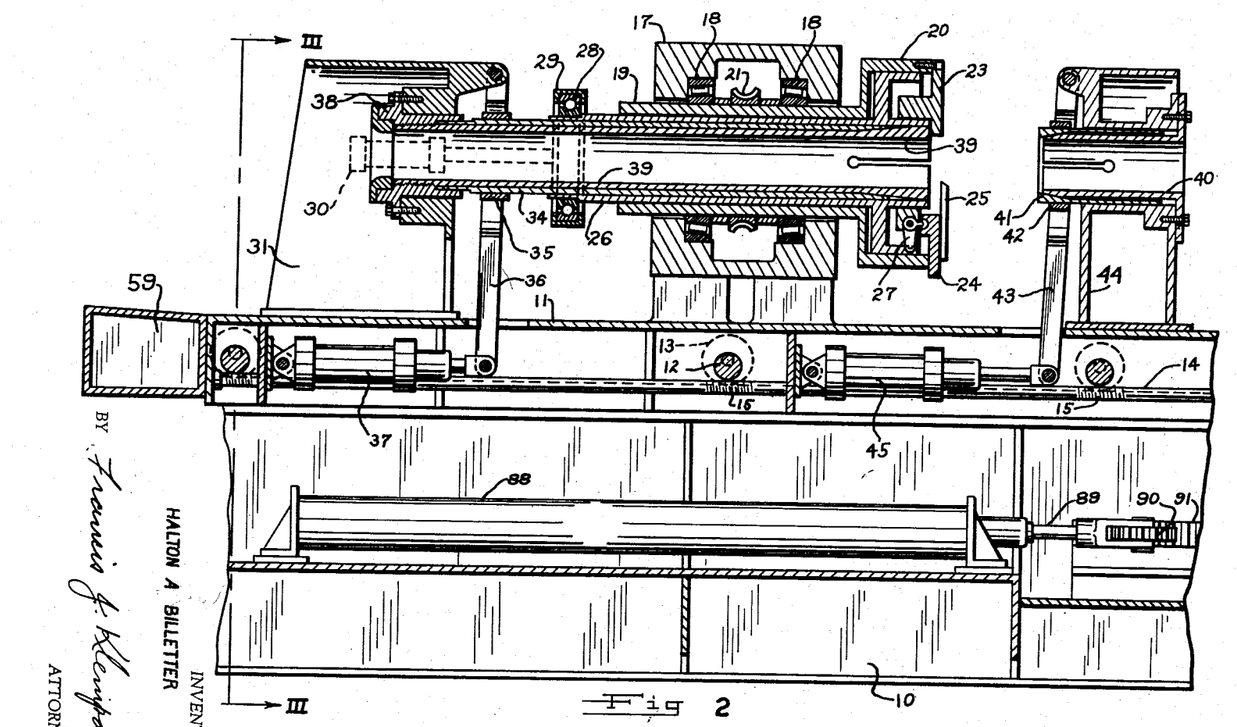
Figure 2 is an enlarged fragmentary axial section of the apparatus of Figure 1.
Figure 3:
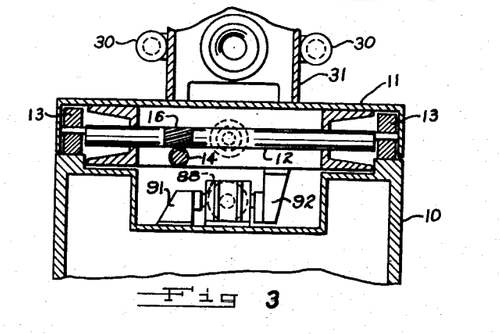
Figure 3 is a fragmentary sectional view taken along line III—III of Figure 2.

In the various figures the reference numeral 10 denotes a base member which is disposed centrally and longitudinally beneath the pass line of, for example, a continuous tube welding mill. Mounted upon the base 10 is a carriage 11 which is adapted for longitudinal to and fro movement along the base. To anti-frictionally mount the carriage 11 for such movement I have provided a plurality of relatively heavy shafts 12 which are transversely disposed in the carriage 11 in longitudinally spaced relation and which support at their outer ends dolly wheels 13. The wheels 13 are supported in eccentric relation to the axis of the shafts 12 as shown in Figure 3. By this means I provide vertical adjustment of the carriage 11 with respect to the base 10 through rotation of the shafts 12. To effect rotation of the shafts 12 an elongated shaft 14 is rotatably journaled in longitudinally disposed relation to the carriage 11 and in tangency with each of the shafts 12. As shown in Figure 2 the shaft 14 is threaded at spaced intervals 15 to engage, in worm gear manner, suitable helical gear teeth 16 provided in the shafts 12. Any suitable means, not shown, may be utilized to rotate the shaft 14 as may be desired. It will be noted that the arrangement herein described for effecting vertical adjustment of the carriage 11 is such that a minimum weight is raised and lowered. Thus the cumbersome mechanisms heretofore employed are eliminated and ease of adjustment is maintained.

Figure 1:
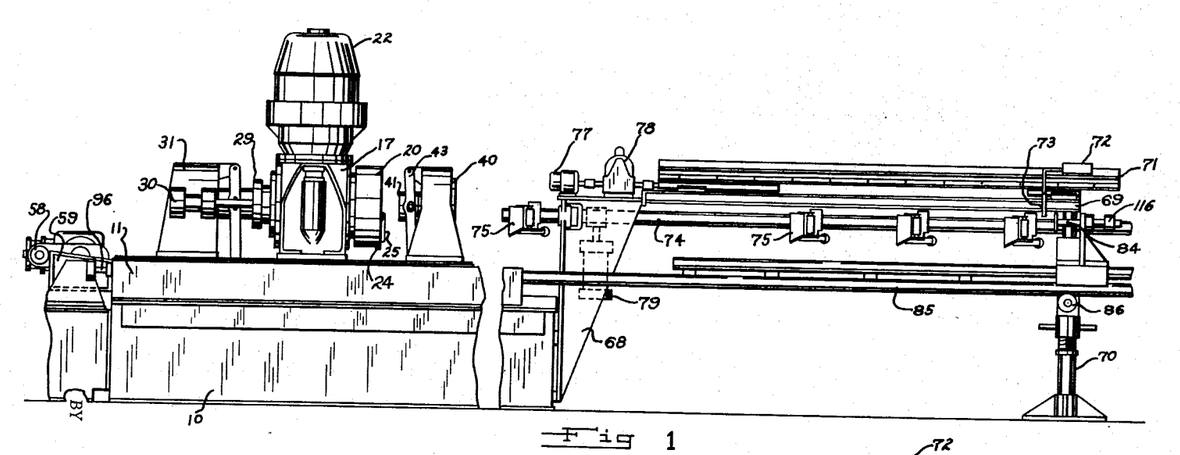
Figure 1 is a fragmentary side elevation of flying cut-off apparatus constructed in accordance with the teachings of my invention.
Figure 12:
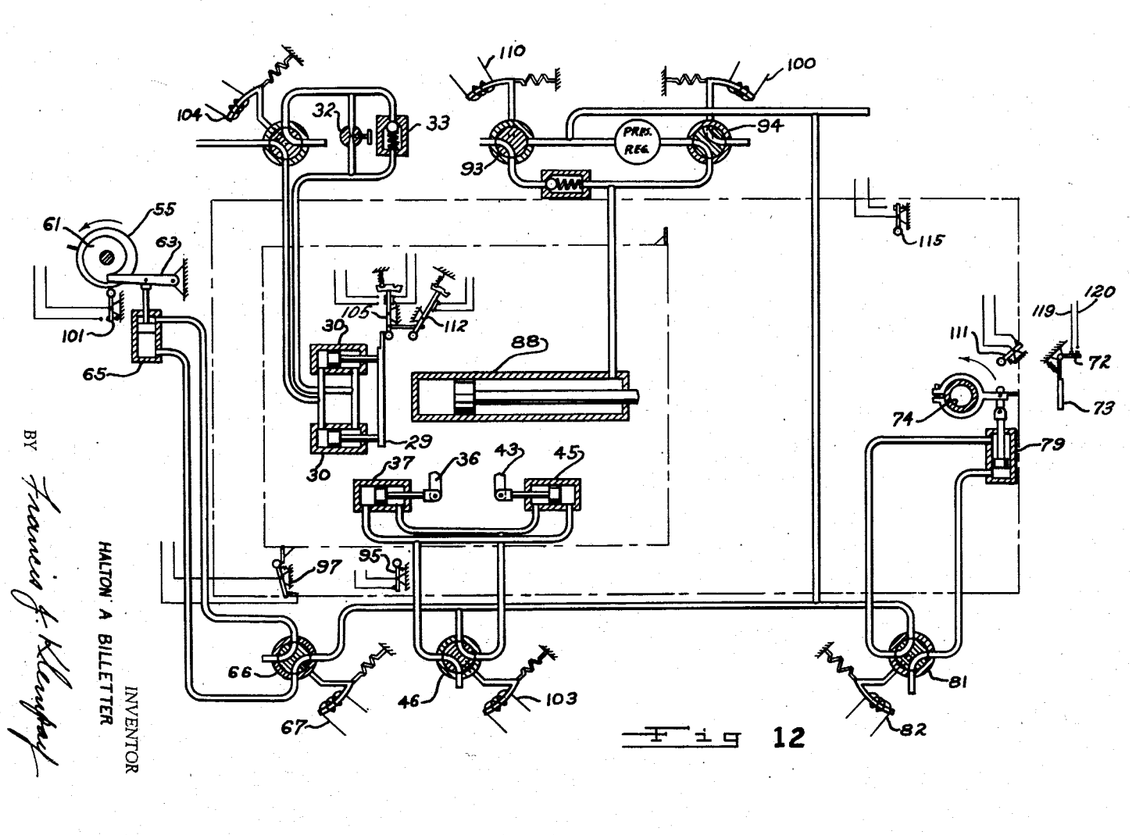
Figure 12 is a schematic representation of the hydraulic and pneumatic control elements of the apparatus of my invention together with certain electrical elements associated therewith.
Figure 13:
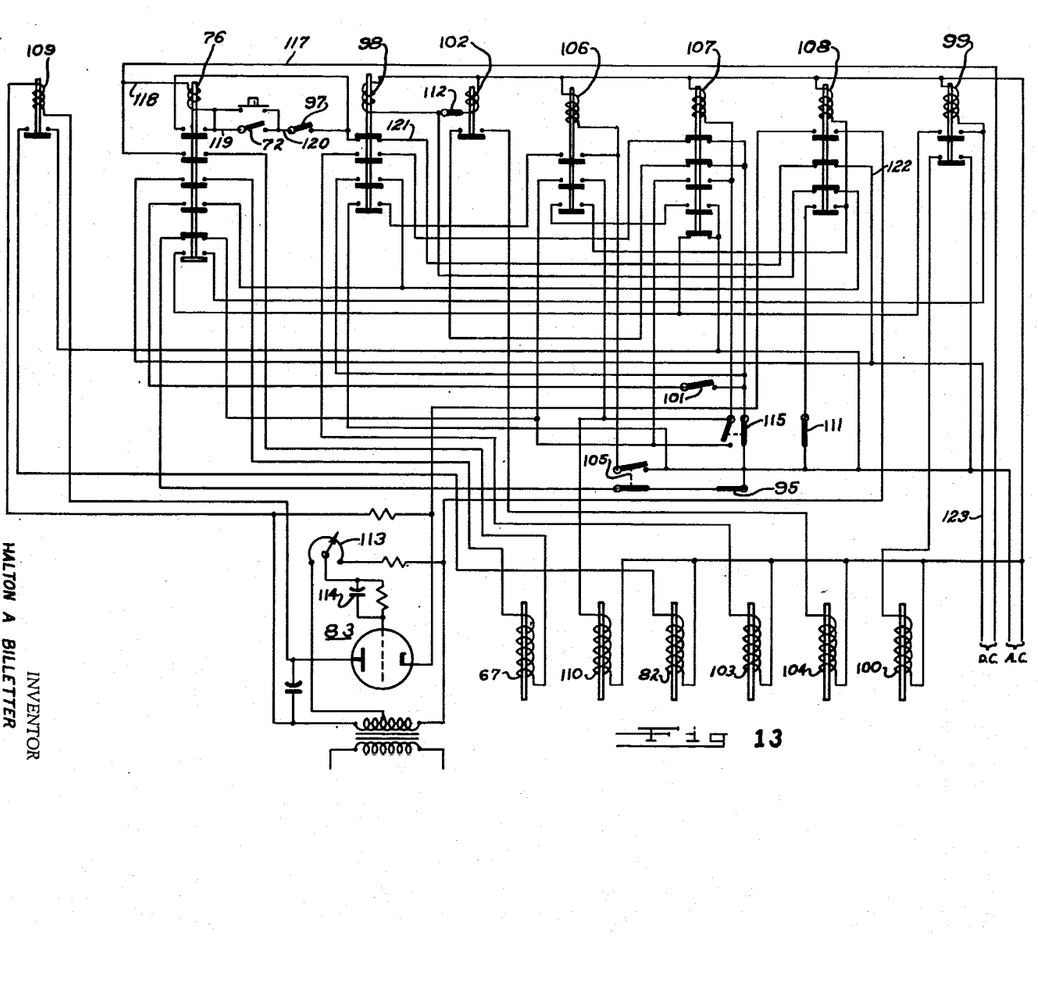
Figure 13 is a schematic representation of the electrical control system of the invention.

Rigidly secured to the carriage 11, substantially centrally thereon, is a housing 17 in which is rotatably journaled, by means of anti-friction bearings 18, the rotary cutting means of the apparatus. Supported directly by the bearings 18 is a rotary housing 19 which has an enlarged tool supporting head 20 at its outer end. A worm wheel 21 is keyed to the rotary housing 19 axially intermediate the bearings 18 and is adapted to engage a worm gear, not shown, which is operated by a vertically mounted variable speed motor 22 secured to the housing 17 as shown in Figure 1. The enlarged outer end 20 of the rotary housing 19 is partially enclosed by an end cap 23 which retains, in radially slidable manner, one or more mounting blocks 24 to which are secured cutting tools 25. Positioned within the rotary housing 19 and slidably keyed thereto is a sleeve 26 the outer end of which is enlarged to engage the inner wall of the outer end portion of the rotary housing 19. As shown, a bell crank lever 27 is pivotally secured to the end cap member 23 and has a leg connecting the tool mounting block 24 and the enlarged outer end of the slidable sleeve 26. It should thus be apparent that longitudinal movement of the sleeve 26 within the housing 19 will cause related movement of the tool 25 in a radial direction. To provide such longitudinal movement of the sleeve 26 I secure the inner race member of a suitable thrust-resisting anti-friction bearing 28 to the inner or left hand end of the sleeve. A yoke 29 is secured to the outer race of the bearing 28 and is also connected to the pistons of a pair of hydraulic actuators 30 which are mounted in diametrically opposed relation on a frame 31 which is in turn rigidly secured to the carriage 11. As shown in Figure 12 the fluid circuit for the actuators 30 includes an accurately adjustable needle valve 32 which is operative to control the rate of forward movement of the yoke 29 and hence the rate of feed of the cutter 25. A bypass check valve 33 provides for maximum rate of return movement of the yoke by shunting the needle valve 32.

In order to securely clamp the pipe or tubing, not shown, for severing by the cutter 25 I provide a second sleeve 34 which is positioned within the sleeve 26 and adapted for sliding movement only with respect to the main housing 17. To prevent the sleeve from rotating, a collar 35 is secured thereto in any suitable manner. Trunnions, not shown, extend outwardly of the collar 35 at each side thereof and are engaged by a lever 36 which is pivotally secured at its upper end to the frame 31 and at its lower end to the piston of a pneumatic or hydraulic actuator 37. Retained within the sleeve 34 and rigidly secured to the frame 31 by means of a flanged coupling 38 is a collet member 39. As shown in Figure 2, the collet 39 is flared outwardly at its forward end and is conventionally provided with a plurality of circumferentially spaced longitudinal slots. As may be understood, movement of the sleeve 34 in the forward direction, in response to the admission of pressure into the actuator 37, will compress the flared forward end of the collet to thus firmly grip a tube positioned therein.

Additional means for gripping a tube is positioned forwardly of the cutting tool 25 and comprises a frame 44, collet 40, longitudinally slidable sleeve 41, collar 42, and lever 43 arranged substantially as above described and operated by a fluid actuator 45. As shown in Figure 12, the actuators 37 and 45 are operated simultaneously by means of a four-way control valve 46.

Thus it may be observed that with a tube securely clamped within the collets 39 and 40, the cutter 25 may be rotated relative thereto while moving inwardly in response to the accurately controlled forward movement of the sleeve 26.

It will be understood that in the severing of continuously advancing stock into predetermined lengths it is necessary to employ means external of the stock itself but associated therewith for accelerating the carriage 11 from rest into synchronism with the stock in order that it may be properly clamped thereto for the cutting operation. It is further necessary, from the standpoint of commercial feasibility, that such means be of a highly accurate nature to insure uniformity of length of the severed stock. To this end I have provided a novel arrangement which is motivated by the rolls of the tube welding mill to thus obtain precisely synchronized motion as desired.

Figure 5:
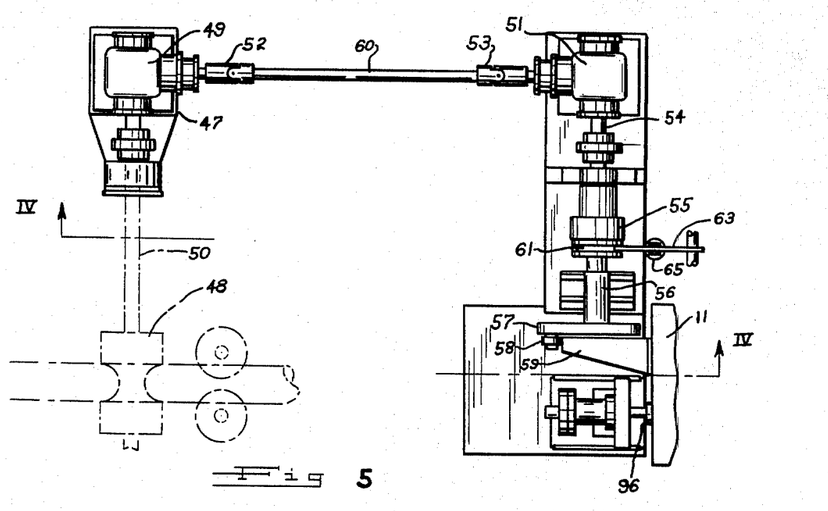
Figure 5 is a top view of carriage accelerating means associated with the apparatus of Figure 1.
Figure 6:
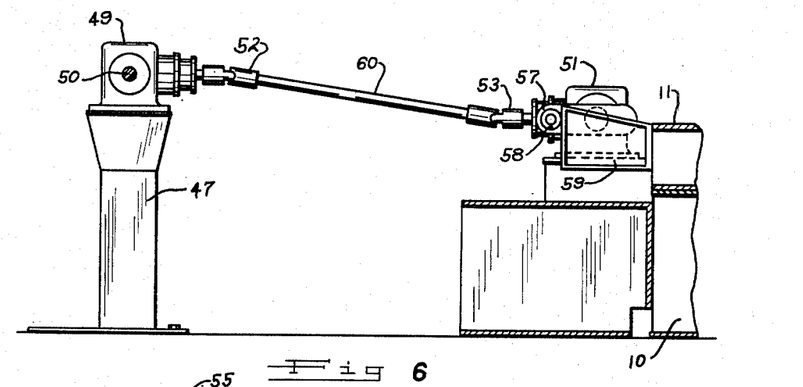
Figure 6 is a sectional view taken along line VI—VI of Figure 5.
Figure 10:
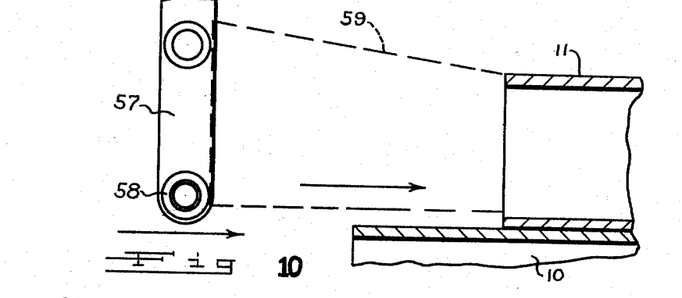
Figure 11:
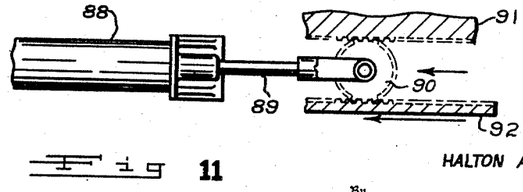
Figure 11 is a fragmentary top view of carriage return means associated with the apparatus of Figures 1 and 2.

Shown in Figures 5 and 6 is my novel arrangement which comprises a stand 47 which is positioned outwardly of the pass line of the stock substantially in alignment with the axis of rolls 48 of the last stand of the mill, not shown, which conventionally includes means to drive the rolls 48 synchronously with the movement of the tube through the welding mill. A gear box 49 is mounted securely on the stand 47 and is operatively connected to one of the rolls 48 by means of shaft 50. A second gear box 51 is positioned forwardly of the first and also outwardly of the pass line as shown. Connecting the gear boxes 49 and 51 through universal joints 52 and 53 is a shaft 60. Extending inwardly of the latter gear box 51 and connected thereto is a shaft 54 which carries at its free end the driving member of a single revolution clutch 55. The driven member of the clutch 55 is connected through shaft 56 to a driving arm 57 which extends radially from the shaft 56 and which carries near its radially outward end an anti-frictionally mounted follower wheel 58. With the carriage 11 at rest in its rearwardly retracted position, and with the driving arm 57 in a horizontally disposed rearwardly extended position as shown in Figure 6, the wheel 58 is caused to bear against the vertical end face of a driving block 59 which is rigidly secured to, and extends rearwardly of the carriage 11. As may be understood, rotation of the arm 57 in a counter-clockwise or downward direction through a 90 degree arc will cause a harmonic acceleration of the carriage 11 from rest to a velocity equal to that of the axis of the wheel 58. Accordingly, it will be further understood that by proper selection of gearing in the gear boxes 49 and 51 I may provide that the arm 57 be rotated at such speed as to cause the axis of the wheel 58 to travel at a velocity in exact accord with the linear advance of the stock. Thus when the arm 57 has rotated through an arc of 90 degrees, as shown in Figure 10, the carriage 11 will be in precise synchronism with the forwardly moving stock and may be readily clamped thereto for the cutting operation.

The utilization of my arrangement for producing harmonic acceleration as described above is particularly advantageous in apparatus of this type wherein the moving element is relatively heavy and accordingly high inertia reaction is encountered. With my arrangement acceleration of the carriage is maximum at the beginning of movement, and is gradually reduced to zero as the driving arm 57 moves into the vertical position. At the same time the mechanical advantage of the arm 57 is greatest as it begins to move downwardly; gradually diminishing to unity at the vertical position. Thus the large inertia forces of the carriage are effectively compensated for by a correspondingly high mechanical advantage of the driving means.

Figure 7:
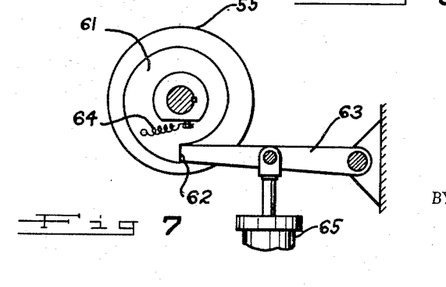
Figure 7 is an enlarged fragmentary illustration of releasing means for a single revolution clutch as utilized in the apparatus shown in Figure 5.
Figure 8:
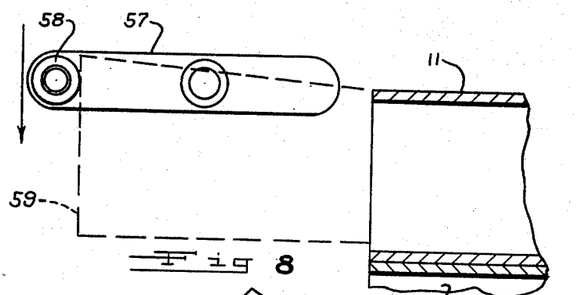
Figures 8–10 are enlarged fragmentary views showing sequential operation of the carriage accelerating means of Figure 5.
Figure 9:
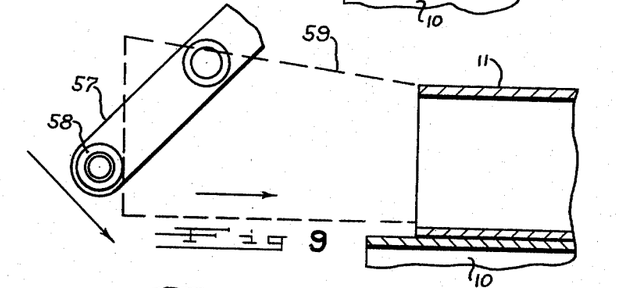

In order to insure accuracy and uniformity in the length of stock to be cut it is of course necessary to provide an extremely accurate means of engaging the single revolution clutch 55 to start the downward movement of the arm 57. For this purpose I have provided a conventional clutch release which comprises a spiral cam 61 having a radial step 62, and a pivotally mounted stop lever 63 as shown in Figure 7. The lever 63 is adapted to bear against the radial step 62 to thus resist rotation of the cam 61 against the action of spring 64 and maintain the clutch 55 in disengagement. A pneumatic actuator 65 is connected to the lever 63 and adapted to move the same outwardly of the step 62 to engage the clutch 55 as desired. It will of course be understood that the lever 63 is released only momentarily so that the step 62 is again engaged after a single revolution to release the clutch.

To control the actuator 65 I provide a fluid valve 66 which is operated by a clutch release solenoid 67 in response to a predetermined movement of the tube stock as will be apparent.

Figure 4:
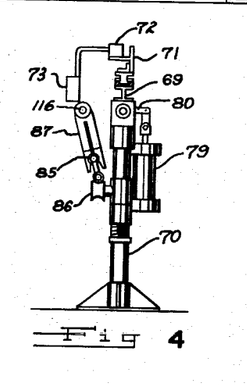
Figure 4 is an end view of tube supporting means as utilized in conjunction with the apparatus of my invention.

Secured to the forward end of the base 10 and extending upwardly therefrom is a mounting bracket 68 which carries at its upper end a longitudinally extending beam 69. Supporting the beam at its outer end is a stanchion 70. As shown in Figures 1 and 4, mounted slidably atop the beam 69 is a second beam 71 to which is secured a flag switch 72. An operator 73 for the flag switch extends outwardly and downwardly therefrom to lie in the line of advance of the stock. Thus it will be apparent that stock passing through the collets 39 and 40 will move outwardly of the base 10 and subsequently into contact with the operator 73 of the switch 72. Through the intermediary of relay 76 the flag switch 72 is operative to energize the clutch release solenoid 67 to initiate movement of the carriage 11. In this respect it may be desirable to utilize D. C. power to energize the relay 76 and solenoid 67 to thus minimize or eliminate time lag variations and the resultant inaccuracies caused thereby. In the present illustration relay 76 is energized by a D. C. power circuit comprising conductors 117 to 123 inclusive and normally closed contacts of relays 98 and 108.

To permit longitudinal adjustment of the operator 73 the beam 71 is longitudinally slidable with respect to the beam 69. As shown in Figure 1 a motor 77 is mounted on the bracket 68 and operates through a reduction gear to rotate a screw which is threadedly connected with the movable beam 71. Motor 77 is arranged to be energized, in opposite directions as desired, by a suitable control, not shown, positioned at a control pulpit, also not shown, and in the usual installation a Selsyn indicator is provided at the control pulpit to indicate the position of the target 73 at any particular time. The Selsyn generator may be arranged to be driven by the output screw of the reduction gear 78 while the Selsyn motor is located at the control pulpit to drive a similar screw which in turn drives a slidable pointer associated with a suitable scale.

In order to support the free end of the tubing during and after the cutting operation I provide a rotatable shaft 74 which is retained in the bracket 68 and stanchion 70. Carriers 75 are secured to the shaft 74 at spaced intervals to thus support the tube stock as it moves forwardly of the base 10. For disposing of the severed lengths of stock a fluid cylinder 79 is secured to the bracket 68 and connected to a lever 80 which extends radially from the shaft 74. Control means including valve 81, solenoid 82 and timer 83 cooperatively operate upon completion of a cutting operation and retraction of the carriage 11 to actuate the cylinder 79, rotate the shaft 74 and thus cause the severed length of tubing to roll off the carriers 75.

To insure final precise control over the length of the stock pieces being cut I provide an abutment 84 which is carried by the outer end of the piston rod of a cylinder 116 which is adapted to be engaged by the leading end of the stock piece to be severed. Upon bottoming of the piston in the cylinder 116 the tube being cut will move to a positive stop relative to the carriage whereby the distance between the leading end of the tube and the cutting tools 25 will be uniform in successive operations. A spring, not shown, normally maintains the abutment 84 in extended position and the construction and operation of this assembly is like that of the abutment assembly described in U. S. Patent No. 2,326,463 to D. A. Johnston. Also, as shown in said patent, the abutment 84 and associated cushioning cylinder is carried by a longitudinally slidable shaft 85 which is supported on the roller 86 and which extends out of the carriage assembly 11. As explained in the above mentioned patent the shaft 85 is rocked as the carriage reaches its outer limit of travel by a suitable cam arrangement to thereby move the abutment 84 out of the path of travel of the stock so that upon reversal of movement of the carriage the stock may continue its forward movement.

For returning the carriage 11 to its normal retracted position at the end of a cutting operation I provide a relatively long-stroke pneumatic cylinder 88 which is securely mounted within the base member 10. The piston rod 89 of the cylinder carries a pinion gear 90 at its outer end, which gear is adapted to enmesh with a rack 91 mounted securely on the base 10, and a rack 92 which depends from the movable carriage 11 as shown in Figure 3. Air is admitted to the forward end of the cylinder 88 at high pressure through the valve 93 and at low pressure through the valve 94. As will be more readily apparent upon consideration of the control system of my apparatus, high pressure air is admitted to the cylinder 88 at the end of a cutting operation to cause the carriage 11 to quickly return to its retracted position. Upon the carriage nearing its fully retracted position, a limit switch 95 is tripped causing the valve 93 to close shutting off the supply of high pressure air. The carriage is then retained in its retracted position by means of low pressure air admitted through valve 94. A hydraulically damped abutment 96 is employed to absorb the momentum of the carriage 11 as it reaches the end of the traverse. It will be noted that the use of the pinion and rack arrangement for return of the carriage 11 permits the use of a cylinder 88 having a stroke of but half the length of travel of the carriage 11.

In the normal operation of my apparatus a cycle will begin with the carriage 11 in its fully retracted position. A limit switch 97 is operated by the carriage when retracted and this switch must be closed in order for a cycle to begin. This is a necessary precaution to insure that the driving block 59 is properly positioned with respect to the arm 57.

With the apparatus thus initially positioned the advancing stock closes the flag switch 72 energizing relay 76 as explained. The closing of relay 76 further causes energization of relay 99, and consequently of solenoids 100 and 67; simultaneously closing valve 94 to relieve the low air pressure from the cylinder 88 and opening valve 66 to release the single revolution clutch 55 to initiate acceleration of the carriage 11. A limit switch 101 is operated by suitable movement of the clutch 55, or the carriage 11 if desired, to energize relays 98 and 102. The closing of relay 98 deenergizes relay 76 and clutch operating solenoid 67, and energizes solenoid 103 to admit air into cylinders 37 and 45 through valve 46, thus clamping the carriage firmly to the advancing stock. The clutch 55 continues to rotate until reaching its initial position, whereupon it is stopped by the lever 63. The closing of relay 102 energizes solenoid 104 to begin inward feeding of the cutting tool 25 at a predetermined rate as governed by the adjustment of the needle valve 32. Initial movement of the yoke 29 which actuates tool 25 sets limit switch 105 to energize relay 106, while continued movement of the tool to completely sever the stock opens the limit switch 112 deenergizing relay 102 and solenoid 104 to cause rapid retraction of the tool 25. Upon full retraction of the tool 25 the limit switch 105 resets to energize relay 107. The latter relay 107, when energized, causes energization of relay 108 and deenergization of relays 98, 106 and 99. At this point the timer 83 begins to time out to close relay 109 after a predetermined time interval. The relays 98, and 99, when deenergized, cause, respectively, releasing of the tube clamping elements, and opening of the valve 94 to supply low pressure air to the carriage return cylinder 88. The energized relay 108 initiates the timer 83, while the relay 107 energizes solenoid 110 to open valve 93 and admit high pressure air to the carriage return cylinder 88.

After the carriage 11 has been retracted sufficiently to clear the severed end of the stock the timer 83 fires closing relay 109 and actuating the dumping solenoid 82. The latter solenoid opens valve 81 admitting air to cylinder 79 and causing the shaft 74 to rotate to dispose of the severed length of tubing. A limit switch 111 is actuated upon sufficient rotation of the shaft 74 to deenergize relay 108, and consequently 109, to return the shaft 74 to its normal tube supporting position. The timer 83 may be easily and accurately adjusted to suit the prevailing conditions, as determined principally by the velocity of the tubing, by adjustment of a potentiometer 113. The said potentiometer is operative to regulate the rate of charge of capacitor 114 and thus determines the time interval between energization of the timer and passage of current to the relay 109.

Continued retraction of the carriage 11 causes limit switch 95 to be tripped deenergizing relay 107 to remove the high pressure air from the cylinder 88. Low pressure air is of course still applied to retain the carriage in its retracted position until the next cycle is initiated by tripping of the flag switch 72.

As a safety precaution I provide an overtravel limit switch 115 which, if tripped by advance of the carriage 11 to the forward end of its traverse, will energize relays 98 and 102, and deenergize relay 107 to unclamp the tube, retract the cutting tool, and return the carriage to its restricted position. Additional contacts, not shown, may be utilized to stop the operation of the tube mill if desired.

It should now be apparent that I have provided improved arrangements for moving a flying cut-off assembly through its required reciprocatory cycle and for controlling the actuation of the various essential components of the complete cut-off assembly which accomplish the objects initially set out. Foremost, the use of the mechanical accelerating device in combination with the stock clamping means of the carriage not only insures the best possible acceleration of the carriage to synchronous feed with the stock but also insures that during the actual cutting or parting operation the stock will remain stationary with respect to the carriage for maximum safety, high rate of speed and most efficient functioning of the parting or cutting device employed. The use of direct current for energizing the accelerating clutch initiating solenoid in response to closure of the target switch insures that the delay inherent in the operation of this and closely associated control instrumentalities will be consistent in each succeeding cycle of operation so that uniform results will be obtained in the operation of the complete apparatus. Since synchronous speed of the carriage with respect to the stock is automatically attained under all conditions due to the mechanical accelerating mechanism and because of the uniform time delay in the initiation of operation of the accelerating means it is possible to accurately predetermine and maintain the length of stock pieces being cut simply by shifting the target switch back and forth as required and this may be accomplished by remote control as explained above. The controls provide readily adjustable means for correlating the required cutting or parting time with the character of the stock being cut and its speed of movement and likewise readily adjustable means for timing the operation of the severed tube dumping means and since these may be adjusted during actual operation of the mechanism it is possible to set up the complete mechanism for maximum efficiency of operation under all conditions of service.

The above described embodiment of the invention should be considered as illustrative only as obviously many changes may be made therein without departing from the spirit or scope of the invention. Reference should therefore be had to the appended claims in determining the scope of the invention.

I claim:

1. In a machine for severing predetermined lengths from tubing continuously advancing longitudinally from a tube forming mill, the combination of a base, a carriage mounted on said base for reciprocatory movement along the pass line of said tubing, cam means operated by said tube forming mill and having discontinuous engagement with said carriage to initially accelerate said carriage from rest to movement synchronous with said tubing, said cam means being inoperative to effect movement of said carriage other than said initial acceleration, means operative following said acceleration to clamp said carriage to said tubing whereby continued synchronous movement of said carriage is effected by said tubing, cutting means mounted on said carriage and adapted to sever said tubing while said carriage is clamped thereto, and means independent of said cam means to return said carriage following a severing operation.

2. Apparatus according to claim 1 further characterized by said cam means comprising a driving block extending longitudinally outward of said carriage and having a vertical end face, a driving arm adapted to rotate about an axis normal to the pass line of said tubing, said arm having a follower at its outer end adapted to contact the end face of said driving block, and means including a stand of said tube forming mill to rotate said arm to cause associated accelerating movement of said driving block and said carriage.

3. Apparatus according to claim 1 further characterized by said cam means comprising a driving block extending longitudinally outward of said carriage and having a cam surface at its outer end, a driving arm adapted to rotate about an axis normal to the pass line of said tubing, said arm having a follower at its outer end adapted to contact the cam surface of said driving block, and means directly associated with the speed of movement of said tubing operative to rotate said driving arm, the arrangement being such that the longitudinal component of the motion of said follower is applied to said cam surface to thus accelerate said driving block and said carriage.

4. In a machine for severing predetermined lengths from tubing continuously advancing longitudinally from a tube forming mill, the combination of a base, a carriage mounted on said base for reciprocatory movement along the pass line of said tubing, cam means operated by said tube forming mill and having discontinuous engagement with said carriage to initially accelerate said carriage from rest to movement synchronous with said tubing, said cam means being inoperative to effect movement of said carriage other than said initial acceleration, a limit switch adapted upon actuation by said advancing tubing to operate said cam means and effect said initial acceleration, means on said carriage to clamp said carriage to said tubing whereby continued synchronous movement of said carriage is effected by said tubing, a second limit switch adapted upon actuation by said carriage to operate said clamping means, cutting means mounted on said carriage and adapted to sever said tubing while said carriage is clamped thereto, a third limit switch adapted upon completion of a severing operation to release said clamping means, and means independent of said cam means operative upon said release to return said carriage to its initial position.

5. In a machine for severing predetermined lengths from tubing continuously advancing longitudinally, the combination of a base, a carriage mounted on said base for reciprocatory movement along the pass line of said tubing, cam means driven synchronously with the movement of said tubing and having discontinuous engagement with said carriage to initially accelerate said carriage from rest to movement synchronous with said tubing, said cam means being inoperative to effect movement of said carriage other than said initial acceleration, means operative immediately following said initial acceleration to clamp said carriage to said tubing whereby continued synchronous movement of said carriage is effected by said tubing, a cutting device mounted on said carriage adapted to sever said tubing while said carriage is clamped thereto, and means independent of said cam means and operative upon the completion of a severing operation to cause said tubing to be released from said carriage and cause said carriage to be returned to its initial position.

6. In a machine for severing predetermined lengths from tubing continuously advancing longitudinally from a tube forming mill, the combination of a base, a carriage mounted on said base for reciprocatory movement along the pass line of said tubing, cam means operated by said tube forming mill and having discontinuous engagement with said carriage to initially accelerate said carriage from rest to movement synchonous with said tubing, said cam means being inoperative to effect movement of said carriage other than said initial acceleration, clamping means operative following said initial acceleration to clamp said carriage to said tubing whereby continued synchronous movement of said carriage is effected by said tubing, cutting means mounted on said carriage and adapted to sever said tubing while said carriage is clamped thereto, means independent of said cam means to return said carriage to its initial position following a severing operation, and means to actuate said cam means including a limit switch positioned in the path of advance of said tubing and a single revolution clutch operative in response to the closing of said limit switch to release said cam means to cause acceleration of said carriage.

7. In a tube severing machine having a base, a carriage slidable on said base, means on said carriage for severing a tube, and means for clamping said carriage to said tube; the combination of a driving block secured to said carriage, said driving block having a rearwardly disposed cam surface, a rotatably mounted driving arm having a cam follower near its outer end adapted to bear against the cam surface of said driving block, means associated with said tubing to cause rotation of said driving arm in proportion to the speed of advance of said tubing, and means for initiating said rotation including a limit switch operable by said tubing, a single revolution clutch operable in response to the actuation of said limit switch to connect said driving arm to the rotating means therefor, and a second limit switch operative in response to a predetermined movement of said driving arm to actuate said means for clamping said carriage to said tube.

8. Apparatus according to claim 7 further including means mounting said first mentioned limit switch for slidable movement parallel with the axis of advance of said tubing, and power operated means for slidably moving said limit switch.

9. In a tube severing machine having a base, a carriage slidable on said base, tube severing means on said carriage, and means for clamping longitudinally advancing tubing to said carriage; the combination of a normally energized fluid-pressure device in said base to yieldably retain said carriage in initial starting position, a crank having a free follower on its outer end and adapted to rotate about an axis transverse to the axis of movement of the tubing, means to rotate said crank at a predetermined angular velocity relative to the linear speed of the advancing tubing whereby upon said crank reaching a predetermined angular position said follower has a forward component of velocity coincident with the speed of movement of the tubing, said carriage having a surface adapted to be discontinuously engaged by said follower whereby said carriage may be accelerated to a linear speed synchronous with the linear speed of the tubing, means comprising an adjustable flag switch engageable by the leading end of the tubing to initiate said crank rotating means and to deenergize said fluid-pressure device, and means to energize said clamping means and said tube severing means in sequence.

10. Apparatus according to claim 9 further including means comprising said fluid-pressure device to return said carriage back to its initial starting position, means to apply an initial high fluid pressure to said device to accelerate the return movement of said carriage, and means to thereafter apply a lower fluid pressure to said device to retain said carriage in its initial starting position.

11. Apparatus according to claim 9 further including means mounting said flag switch for sliding movement parallel with the axis of movement of the tubing, and power operated means to slidably move said limit switch to desired adjusted position.

12. In a flying cut-off of the type having a base, a carriage mounted on said base for reciprocatory movement between extended limit position, stock severing means on said carriage and means to cause said carriage to move in either direction along its reciprocatory path; the improvement comprising means to support stock advancing forwardly of said stock severing device, means to cause said carriage to move synchronously with said stock during operation of said stock severing means, means to sense the completion of operation of said severing means to thereupon initiate return movement of said carriage independent of its position on said base, means to withdraw said supporting means, and an adjustable timer arranged to be initiated by said means to sense and operative upon timing out its period to actuate said means to withdraw.

References Cited in the file of this patent

UNITED STATES PATENTS

| Number | Name | Date |
|---|---|---|
| Re. 22,114 | Borzym | June 16, 1942 |
| 129,113 | Drake | July 16, 1872 |
| 979,898 | Steele | Dec. 27, 1910 |
| 1,348,635 | Fretter | Aug. 3, 1920 |
| 2,186,061 | Berg | Jan. 9, 1940 |
| 2,209,995 | Morris | Aug. 6, 1940 |
| 2,325,431 | Shippy | July 27, 1943 |
| 2,326,463 | Johnston | Aug. 10, 1943 |
| 2,350,975 | Rodder | June 6, 1944 |
| 2,540,166 | Frank | Feb. 6, 1951 |
| 2,547,157 | Gibbons | Apr. 3, 1951 |
| 2,562,879 | Abbey | Aug. 7, 1951 |